United States Patent [19]

Hill

[11] Patent Number: 4,515,265
[45] Date of Patent: May 7, 1985

[54] BELT CONVEYER SYSTEM AND CONVEYER BELT USABLE THEREWITH

[76] Inventor: Daryl G. Hill, P.O. Box 9308, Yakima, Wash. 98909

[21] Appl. No.: 409,179

[22] Filed: Aug. 18, 1982

[51] Int. Cl.³ .................... B65G 15/08; B65G 15/40
[52] U.S. Cl. ................................................ 198/821
[58] Field of Search ........... 198/688, 821, 822, 834, 198/850, 820, 818

[56] References Cited

U.S. PATENT DOCUMENTS

| | | | |
|---|---|---|---|
| 874,982 | 12/1907 | Norton | 198/688 |
| 2,818,962 | 1/1958 | Hörth | 198/822 |
| 2,818,965 | 1/1958 | Hörth | 198/317 |
| 2,836,283 | 5/1958 | Hörth | 198/303 |
| 2,925,165 | 2/1960 | Rake | 198/688 |
| 3,245,518 | 4/1966 | Reibel et al. | 198/688 X |
| 3,464,538 | 9/1969 | Hartmann | 198/688 |
| 3,545,598 | 12/1970 | McGinnis | 198/821 X |
| 3,910,404 | 10/1975 | Henrekson | 198/835 |
| 4,072,062 | 2/1978 | Morling et al. | 198/834 |
| 4,205,745 | 6/1980 | Van Lingen | 198/821 X |

FOREIGN PATENT DOCUMENTS

| | | |
|---|---|---|
| 889275 | 7/1949 | Fed. Rep. of Germany . |
| 1005898 | 4/1957 | Fed. Rep. of Germany . |
| 1024876 | 8/1958 | Fed. Rep. of Germany . |
| 1431751 | 4/1972 | Fed. Rep. of Germany . |
| 2437359 | 9/1979 | France ................................ 198/688 |
| 1567074 | 5/1980 | United Kingdom . |

Primary Examiner—Joseph E. Valenza
Assistant Examiner—David A. Bucci
Attorney, Agent, or Firm—Fleit, Jacobson, Cohn & Price

[57] ABSTRACT

A belt conveyer and a conveying system using a belt conveyer. The system is designed to convey articles around curves and between vertically and horizontally spaced locations. The belt used in the system has a central substantially inextensible flexible spine and an upper load carrying portion supported by the spine. The load carrying portion has a plurality of ribs and a plurality of pleats interposed between the ribs. The ribs provide rigidity for the belt and limit movement of articles with respect to the belt, while the pleats provide longitudinal extension and contraction of side edges when the belt is following a curved path. The distance between top edges of the pleats and top edges of the ribs increases from outer edges of the belt towards the center so that top edges of the pleats are generally V shaped and conveyed articles and juices and liquids exuded from the conveyed articles tend to be conveyed in a central region of the belt.

21 Claims, 3 Drawing Figures

BELT CONVEYER SYSTEM AND CONVEYER BELT USABLE THEREWITH

BACKGROUND OF THE INVENTION

1. Field of the Invention

The present invention relates to belt conveyers and belt conveyer systems. More particularly, the invention relates to a belt conveyer system for conveying articles between vertically and horizontally spaced apart locations.

2. Description of the Prior Art

U.S. Pat. No. 3,545,598, entitled "Laterally Flexible Belt Conveyor", describes a corrugated, V-shaped belt designed to follow a path with sharp lateral curvature. The belt is formed with corrugations that allow the belt to bend around corners. End portions of the belt protrude upwardly so that the center of the belt forms a trough for carrying articles. A cable core is provided in a central portion of the belt that provides both resilience and resistance to stretching. The central portion of the belt appears to have a flat surface and all of the corrugations have the same height. Thus, the belt is not designed to carry articles between vertically spaced apart locations.

U.S. Pat. No. 2,836,283, entitled "Belt Conveyor System", describes a belt system designed to follow a laterally curved path. The belt is supported by a central pulling or traction member which has a central cable core to reduce elongation. The belt has corrugations that allow it to bend around corners. The belt, however, is not designed to convey articles between vertically spaced apart locations.

U.S. Pat. No. 3,910,404, entitled "Conveying Means", describes the use of drive pins and sprocket wheels to drive a belt. The drive pins, however, do not guide movement of the belt to and from the sprocket wheels.

U.S. Pat. No. 2,925,165, entitled "Belt", describes a belt in which a plurality or ribs are positioned between adjacent cleats of greater height. According to the patent, the cleats cooperate with the ribs to support packages and are designed to engage and arrest sliding motion of an article with respect to the ribs. The heights of the ribs, however, are constant so that conveyed articles will not tend to be concentrated in the center of the belt.

Other types of conveying belts and systems are described in U.S. Pat. No. 874,982, entitled "Conveyer Belt"; U.S. Pat. No. 2,818,965, entitled "Runway for Conveyor Belts Passing Through Curves; U.S. Pat. No. 3,245,518, entitled "Belt With Integrally Molded Teeth and Vanes"; and U.S. Pat. No. 4,205,745, entitled "Conveyor Loading Station".

SUMMARY OF THE INVENTION

The present invention provides both an improved belt conveyer system and a belt conveyer usable with such system. The improved system is designed to transfer articles between horizontally and vertically spaced apart locations. Further, the system is designed to convey both liquids and solids.

One embodiment of the present invention provides a belt conveyer having a central substantially inextensible flexible spine and an upper load carrying portion supported by the spine. The upper portion has longitudinally extending side edges spaced outwardly from side edges of the central spine. A plurality of ribs and a plurality of pleats extend transversely to side edges of the spine. Provision of the pleats allows the side edges to longitudinally expand and contract when the belt is following a curved conveying path. The ribs have substantially equal heights and provide reinforcement for the belt. The pleats are positioned between adjacent ribs and have top edges forming a generally V-shape, with the apex of the V located over the spine. The heights of the pleats are less than the heights of the ribs so that the ribs will limit movement of conveyed articles with respect to the belt as the belt follows a vertically inclined path. Since the pleats have top edges angled inwardly, conveyed articles, such as fruits and juices exuded from the fruits, tend to be concentrated in the center of the belt.

Preferably, the central spine of the belt and the upper portion are molded as an integral unit. Also, the central spine includes a longitudinally extending reinforcing cable or bundle of cables.

In one embodiment, pins protrude at regular intervals from both sides of the central spine. The pins are received in recesses formed in side walls of a channel of a guide track so that the portions of the guide track forming the recesses support and guide movement of the conveyer belt.

One embodiment of the conveyer belt system provided by the present invention utilizes a conveyer belt having the previously described characteristics and a guide track having confronting, parallel spaced apart side walls defining a guide channel having recesses formed in side walls thereof. The portions of the guide track forming the recesses support the pins protruding from the central spine of the belt so that the guide track both supports and guides movement of the belt. A drive sprocket is aligned with the guide channel and has a peripheral surface with a plurality of equally spaced apart grooves receiving the pins of the conveyer belt to provide a positive drive for the belt.

Preferably, the conveyer belt is formed from a plurality of interconnected belt sections.

The invention, and its objects and advantages, will become more apparent in the detailed description of the preferred embodiment hereinafter presented.

BRIEF DESCRIPTION OF THE DRAWINGS

In the detailed description of the preferred embodiment of the invention hereinafter presented, reference is made to the accompanying drawings, in which.

DESCRIPTION OF THE PREFERRED EMBODIMENT

Figure 1:
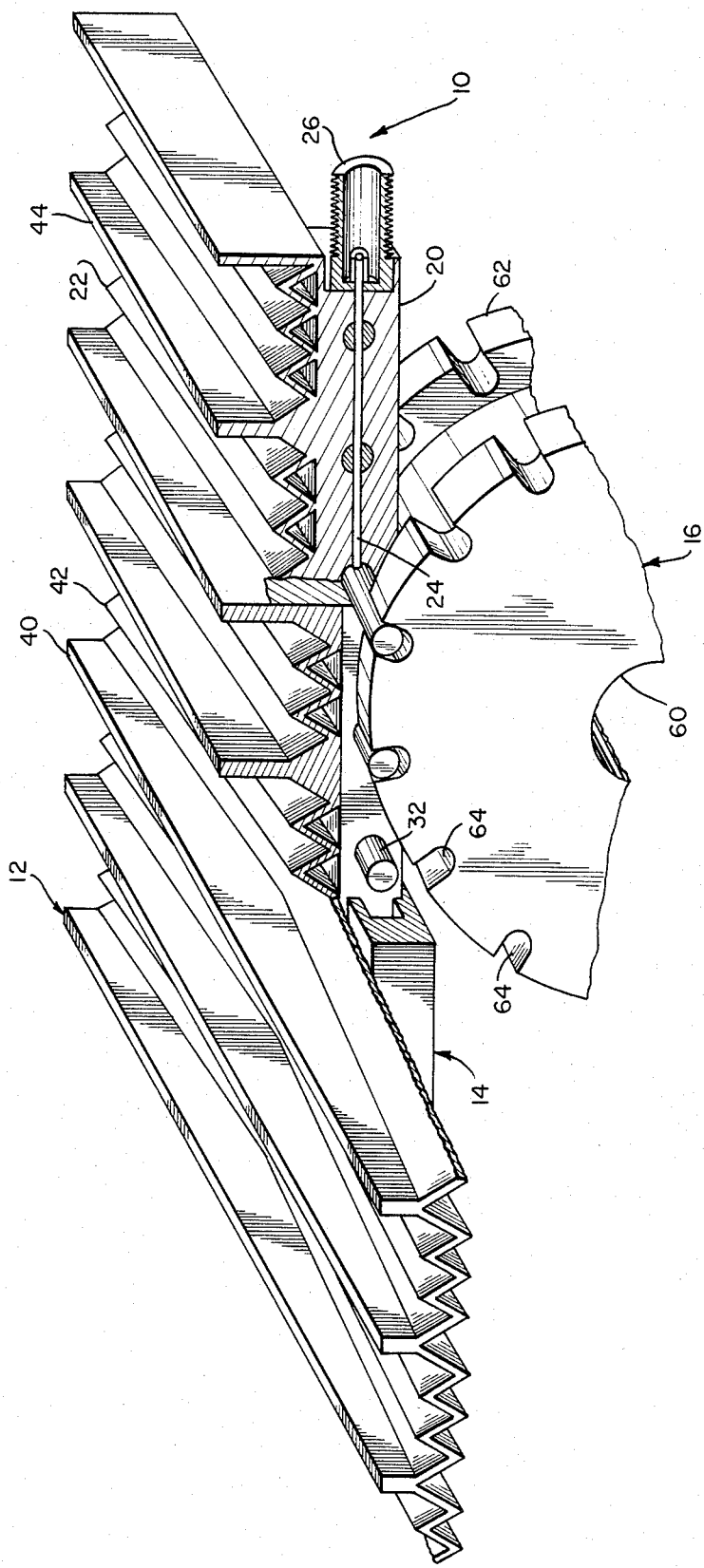
FIG. 1 is a schematic perspective, partially in section, of one embodiment of a belt conveyer system according to the present invention.

The present description will be directed in particular to elements forming part of, or cooperating more directly with, the present invention. Elements not specifically shown or described herein are understood to be selectable from those known in the art.

Referring now to the drawings, and to FIG. 1 in particular, one embodiment of the present invention is illustrated and will be described in connection with a belt conveyer system, generally designated 10. Such system includes a belt conveyer, generally designated 12; a guide track, generally designated 14, for guiding and supporting the belt conveyer 12; and a drive sprocket, generally designated 16, for positively driving the conveyer belt 12.

Figure 2:
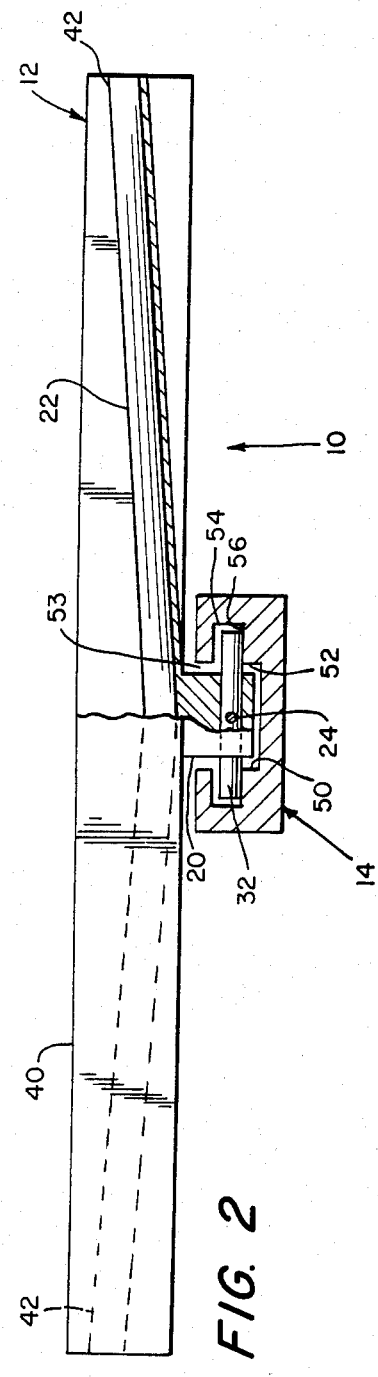
FIG. 2 is a schematic end view, partially in section, of the belt conveyer system of FIG. 1.

As best illustrated in FIG. 2, the belt conveyer 12 is formed from a plurality of interconnected sections, with each section having a central spine 20 and an upper load carrying portion 22 supported by the central spine. Preferably, the central spine and upper portion are molded as an integral unit. One or more longitudinally extending cables 24 are provided in the central spine 20 to reinforce the central spine so that the spine is both flexible and substantially inextensible. One or more male connectors 26 and one or more female connectors (not illustrated) are provided on opposed transverse edges of each section of the belt conveyer 12. The male connector of one section is received in the female connector of the adjacent section so that the sections can be interconnected to form the belt 12. The male connector 26, which has been illustrated in FIG. 1, has been omitted from FIG. 2.

Support elements, such as pin 32, protrude outwardly from side faces of the central spine 20. Preferably, the support element is a one-piece member with a central portion received in the central spine and end portions protruding from side faces of the central spine.

Figure 3:
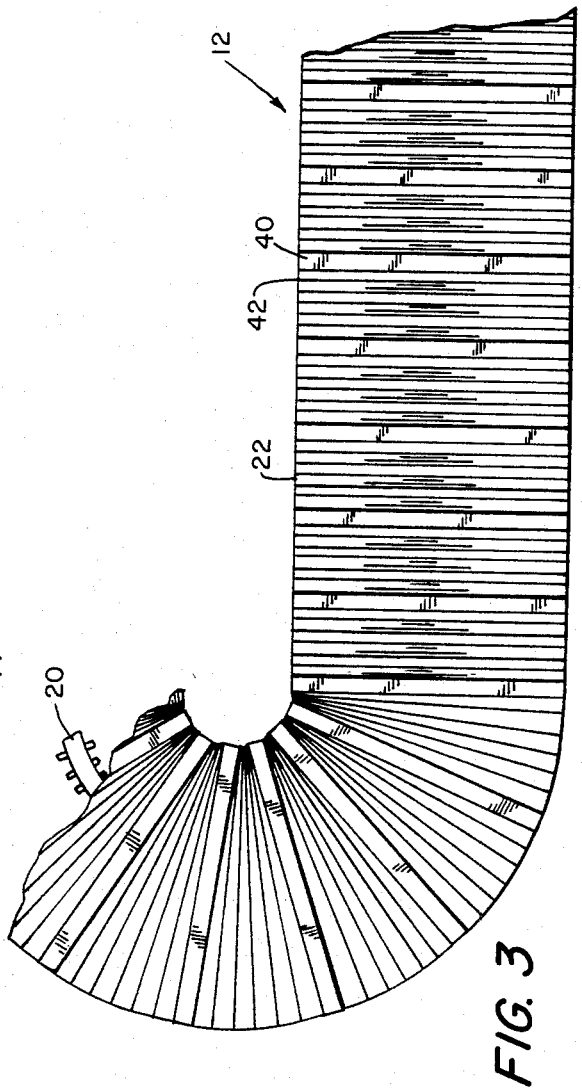
FIG. 3 is a top view, on a reduced scale, of the conveyer belt used in the system of FIG. 1.

The upper portion 22 of the belt conveyer 12 is provided with a plurality of transversely extending ribs 40 and pleats 42. The ribs 40 have a dual function of providing transverse rigidity for the belt and limiting movement of articles with respect to the belt when the belt is following a vertically inclined path. Preferably, the ribs have equal heights and flat upper surfaces or edges 44. As illustrated in FIG. 3, one or more pleats 42 are disposed between adjacent ribs 40. The pleats, in cross section, have generally inverted V-shapes and are designed to make the side edges of the belt longitudinally extensible and contractable. Preferably, top edges of both the ribs and pleats are at substantially right angles to the side edges of the central spine.

The distance between top edges of the pleats 42 and top edges of the ribs 40 is least in the vicinity of outer margins or side edges of the belt. The distance increases towards the central spine so that the top edges of the pleats 42 are generally V-shaped and conveyed articles tend to be concentrated over the central spine. When the belt is used to convey fruit, such design tends to prevent loss of juices exuded from the fruit by the collecting of the juices within troughs defined between each of the pleats. Preferably, the transverse edge regions of the upper portion 22 are movable with respect to the central spine 20 so as to provide access to the male connector 26 and the female connector.

In one embodiment of the invention, the height of the pleats is 0.5 inches; the thickness of the pleat walls is 0.062 inches; and the upper surfaces or edges of the pleats are angled toward the center of the belt so as to make an approximately 12° V. The height of the ribs is 1.75 inches, and their thickness is 0.25 inches. The width of the belt is 14 inches and the length of an individual belt section is 24 inches. The central spine or core 20 has a rectangular cross section of 0.75×0.75 inches. The diameter of the drive pins is 0.5 inches, and the spacing between the center of adjacent pins is 2 inches. It should be appreciated that such dimensions are merely representative of one embodiment of the present invention and are in no way limiting of the inventive concept.

The guide track 14 preferably is an integral member having a generally U-shape. Confronting, spaced apart parallel side walls 50 and 52 of the guide track 14 define a channel 53 that receives the central spine 20 of the conveyer 12. Recesses 54 are formed in the side walls. The recesses 54 are shaped to receive, support, and guide movement of the support pins 32. Preferably, the only contact between the belt 12 and the guide track 14 is the contact of the lower surfaces of the support pins 32 with the lower surfaces 56 of the recesses. Frictional forces are minimized by forming the pins 32 of stainless steel and the guide track 14 of a suitable nylon material.

Preferably, the belt is formed from urethane or other suitable material so that outer side edges of the belt can stretch and the corrugations can flatten at outer edges of the belt when the belt is following a curved path, as schematically illustrated in FIG. 3. Inner side edges (portions of the belt closest to the center of the turn) are designed to flex, for instance, the distance between the pleats is reduced, to facilitate movement of the belt around the curved path.

Referring now to FIG. 1, it can be noted that the drive sprocket 16 has spaced apart sprockets 60 and 62 with peripheral surfaces having a plurality of equally spaced apart grooves 64 formed therein. The shapes of the grooves 64 are complimentary to the shapes of the support elements or pins 32 so that the pins are received in the grooves, and the belt is advanced by rotation of the sprockets. This type of drive eliminates slippage between the sprockets and the belt, which often occurs with friction drives when the belt is wet because of juices or liquids exuded from the articles being conveyed.

The belt conveyer system of the present invention is designed to convey articles in a straight line, around corners, and between horizontally and vertically spaced locations. Because of the flexible nature of the belt, the load carrying portions maintain substantially constant angles with respect to the curvature of the guide track.

The belt conveyer system provided by the present invention has numerous uses. For instance, such system can be mounted on a wheeled support frame designed to be towed through vineyards. Grapes are removed from the individual vines and deposited on first portions of the belt. The deposited grapes, together with juices exuded by the grapes, are conveyed to a second location horizontally and vertically spaced from the first location where the grapes and juices are removed from the belt. Use of the conveyer system provided by the present invention provides a relatively compact structure that greatly facilitates the harvesting of the grapes.

Previously, a specific embodiment of the present invention has been described. It should be appreciated, however, that such embodiment has been described for the purposes of illustration only, without any intention of limiting the scope of the present invention. Rather, it is the intention that the present invention be limited only by the appended claims.

What is claimed is:

1. A conveyer belt comprising a central substantially inextensible flexible spine and an upper load carrying portion supported by said central spine, said load carrying portion having longitudinally extending side edges spaced outwardly from side edges of said central spine and being inclined upwardly from the center part to said side edges of the load carrying portion and said load carrying portion comprising a plurality of transversely extending pleats and a plurality of transversely extending ribs, each rib being mounted on top of a different one of said pleats, said ribs having their upper edge located higher than the top edge of said pleats, at least one of said pleats being disposed between adjacent ribs.

2. A conveyer belt according to claim 1, wherein said central spine and said load carrying portion are molded as an integral unit.

3. A conveyer belt according to claim 1 or 2, wherein said central spine includes a longitudinally extending reinforcing cable.

4. A conveyer belt according to claim 1, wherein said central spine comprises means for driving the belt, characterized in that said means comprise a plurality of pins protruding at regular intervals from both sides of the central spine and engageable with sprockets and with guide and support means between said sprockets.

5. A conveyer belt according to claim 1, wherein the arrangement of said ribs is such that the outer margins of said belt are longitudinally extensible and contractable whereby the conveyer is positionable to follow a transversely curved path.

6. A belt conveyer system comprising a conveyer belt according to claim 4, wherein it comprises at least one sprocket having two axially spaced apart sprocket members with a plurality of equally spaced apart grooves formed in their peripheral surfaces for receiving said pins, and a guide and support track having confronting, spaced apart parallel side walls defining a guide channel for said spine and opposite recesses formed in said side walls to receive, support and guide said pins.

7. A belt conveyer system according to claim 6, wherein said conveyer belt is comprised of a plurality of interconnected belt sections.

8. A conveyer belt according to claim 1, wherein said ribs have substantially equal heights, the distance between the inclined top edges of the pleats and the flat top edges of the ribs increasing from the side edges of the load carrying portion toward the central spine.

9. A conveyer belt comprising a central substantially inextensible flexible spine and an upper load carrying portion supported by said central spine, said central spine and said load carrying portion being molded as an integral unit, said load carrying portion having longitudinally extending side edges spaced outwardly from side edges of said central spine and being inclined upwardly from the center part to said side edges of the load carrying portion and said load carrying portion comprising a plurality of transversely extending pleats and a plurality of transversely extending ribs said ribs having their upper edge located higher than the top edge of said pleats, at least one of said pleats being disposed between adjacent ribs, and said central spine further comprises a plurality of projecting means protruding from the central spine for engagement with guide means.

10. A conveyer belt according to claim 9, wherein said central spine includes a longitudinally extending reinforcing cable.

11. A conveyer belt according to claim 9, wherein the arrangement of said ribs is such that the outer margins of said belt are longitudinally extensible and contractable whereby the conveyer is positionable to follow a transversely curved path.

12. A belt conveyer system comprising a conveyer belt according to claim 9, wherein it comprises at least one sprocket having two axially spaced apart sprocket members with a plurality of equally spaced apart grooves formed in their peripheral surfaces for receiving said plurality of projecting means, and a guide and support track having confronting, spaced apart parallel side walls defining a guide channel for said spine and opposite recesses formed in said side walls to receive, support and guide said plurality of projecting means.

13. A belt conveyer system according to claim 12, wherein said conveyer belt is comprised of a plurality of interconnected belt sections.

14. A conveyer belt according to claim 9, wherein said ribs have substantially equal heights, the distance between the inclined top edges of the pleats and the flat top edges of the ribs increasing from the side edges of the load carrying portion toward the central spine.

15. A conveyer belt for conveying articles, said conveyer belt comprising a central substantially inextensible flexible spine and an upper load carrying portion supported by said central spine, said load carrying portion having longitudinally extending side edges spaced outwardly from side edges of said central spine and being inclined upwardly from the center part to said side edges of the load carrying portion and said load carrying portion comprising a plurality of transversely extending pleats and a plurality of transversely extending ribs, said ribs having their upper edge located higher than the top edge of said pleats, at least one of said pleats being disposed between adjacent ribs, said ribs having substantially equal heights, the distance between the inclined top edges of the pleats and the flat top edges of the ribs increasing from the side edges of the load carrying portion toward the central spine for supporting articles on top of said pleats and said pleats defining troughs located between said pleats for collecting fluid.

16. A conveyer belt according to claim 15, wherein said central spine and said load carrying portion are molded as an integral unit.

17. A conveyer belt according to claim 15, wherein said central spine includes a longitudinally extending reinforcing cable.

18. A conveyer belt according to claim 15, wherein said central spine comprises means for driving the belt, characterized in that said means comprise a plurality of pins protruding at regular intervals from both sides of the central spine and engageable with sprockets and with guide and support means between said sprockets.

19. A conveyer belt according to claim 15, wherein the arrangement of said ribs is such that the outer margins of said belt are longitudinally extensible and contractable whereby the conveyer is positionable to follow a transversely curved path.

20. A belt conveyer system comprising a conveyer belt according to claim 18, wherein it comprises at least one sprocket having two axially spaced apart sprocket members with a plurality of equally spaced apart grooves formed in their peripheral surfaces for receiving said pins, and a guide and support track having confronting, spaced apart parallel side walls defining a guide channel for said spine and opposite recesses formed in said side walls to receive, support and guide said pins.

21. A belt conveyer system according to claim 20, wherein said conveyer belt is comprised of a plurality of interconnected belt sections.

* * * * *